US010664127B2

(12) United States Patent
Anker et al.

(10) Patent No.: US 10,664,127 B2
(45) Date of Patent: May 26, 2020

(54) CONNECTED TV 360-DEGREE MEDIA INTERACTIONS

(71) Applicant: Facebook, Inc., Menlo Park, CA (US)

(72) Inventors: Andrew Lawrence Anker, Woodside, CA (US); Michael Paul Mastrangelo, Seattle, WA (US); Ryan Casey, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/857,780

(22) Filed: Dec. 29, 2017

(65) Prior Publication Data

US 2019/0205008 A1  Jul. 4, 2019

(51) Int. Cl.
| | | |
|---|---|---|
| *G06F 3/0481* | (2013.01) |
| *H04N 21/44* | (2011.01) |
| *H04N 21/432* | (2011.01) |
| *H04N 21/218* | (2011.01) |
| *H04N 21/472* | (2011.01) |
| *H04N 21/81* | (2011.01) |
| *H04N 5/44* | (2011.01) |
| *H04N 21/422* | (2011.01) |
| *G06F 3/0346* | (2013.01) |
| *H04N 21/41* | (2011.01) |

(52) U.S. Cl.
CPC ........ *G06F 3/04815* (2013.01); *G06F 3/0346* (2013.01); *H04N 5/4403* (2013.01); *H04N 21/21805* (2013.01); *H04N 21/4126* (2013.01); *H04N 21/42222* (2013.01); *H04N 21/4325* (2013.01); *H04N 21/44* (2013.01); *H04N 21/472* (2013.01); *H04N 21/816* (2013.01); *G06F 2203/0384* (2013.01); *H04N 2005/4428* (2013.01)

(58) Field of Classification Search
None
See application file for complete search history.

(56) References Cited

U.S. PATENT DOCUMENTS

| | | | | |
|---|---|---|---|---|
| 2010/0188503 | A1* | 7/2010 | Tsai .................. | G01C 21/20 |
| | | | | 348/142 |
| 2012/0062471 | A1* | 3/2012 | Poulidis ............... | H04N 5/4403 |
| | | | | 345/173 |
| 2018/0053280 | A1* | 2/2018 | Kim .................... | G06T 3/20 |

* cited by examiner

*Primary Examiner* — Vu Nguyen
(74) *Attorney, Agent, or Firm* — Baker Botts L.L.P.

(57) ABSTRACT

In particular embodiments, a system includes a processor operable to receive, from a client device, a user selection of 360-degree media content to display on a display device that is separate from the client device. The processor is further operable to provide the selected 360-degree media content for display on the display device. The processor is further operable to receive motion data from the client device, the motion data indicating motion of the client device. The processor is further operable to provide instructions to adjust a viewing direction within the 360-degree media content displayed on the display device according to the received motion data from the client device.

20 Claims, 6 Drawing Sheets

CONNECTED TV 360-DEGREE MEDIA INTERACTIONS

TECHNICAL FIELD

This disclosure relates generally to television and social networking.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a Global Positioning System (GPS) receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments enhance a user's social networking and television viewing experience by providing a user the ability to control views within 360-degree media content such as a 360-degree video or image. In particular embodiments, a display device of a user such as a TV is utilized to view 360-degree media content selected by the user. In some embodiments, the 360-degree media content is provided by a digital media player and is selected using a wireless remote control. In other embodiments, the 360-degree media content is wirelessly streamed, screencast ("cast" or "casting"), or otherwise provided by a client device such as a smartphone. For example, a mobile application running on the user's smartphone may cast or wirelessly stream a 360-degree video from a newsfeed of a user to a digital media player or smart TV for display on the TV. While the 360-degree video is being displayed on the TV, the user may utilize another client device to control the viewing direction within the 360-degree video. By rotating and tilting their smartphone, for example, the viewing direction within the 360-degree video being displayed on the TV may change to match the movements of the smartphone. As a result, the user may be able to cast or otherwise display 360-degree media content such as a 360-degree videos and images on a larger viewing screen while maintaining control over the viewing direction within the 360-degree media content.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments enhance a user's social networking and television viewing experience by providing a user the ability to control views in 360-degree media content such as a 360-degree video or image. As a particular example, a mobile application running on the user's smartphone may cast or wirelessly stream a 360-degree video from a newsfeed of a user to a digital media player or smart TV for display on the TV. While the 360-degree video is being displayed on the TV, the user may utilize their smartphone to control the viewing direction within the 360-degree video. By rotating and tilting their smartphone, the viewing direction within the 360-degree video being displayed on the TV may change to match the movements of the smartphone. As a result, the user may be able to cast or otherwise display 360-degree media content such as a 360-degree videos and images on a larger viewing screen while maintaining control over the viewing direction within the 360-degree media content. These and other features of the disclosed embodiments are discussed in more detail below with respect to FIGS. 1-7.

Figure 1:
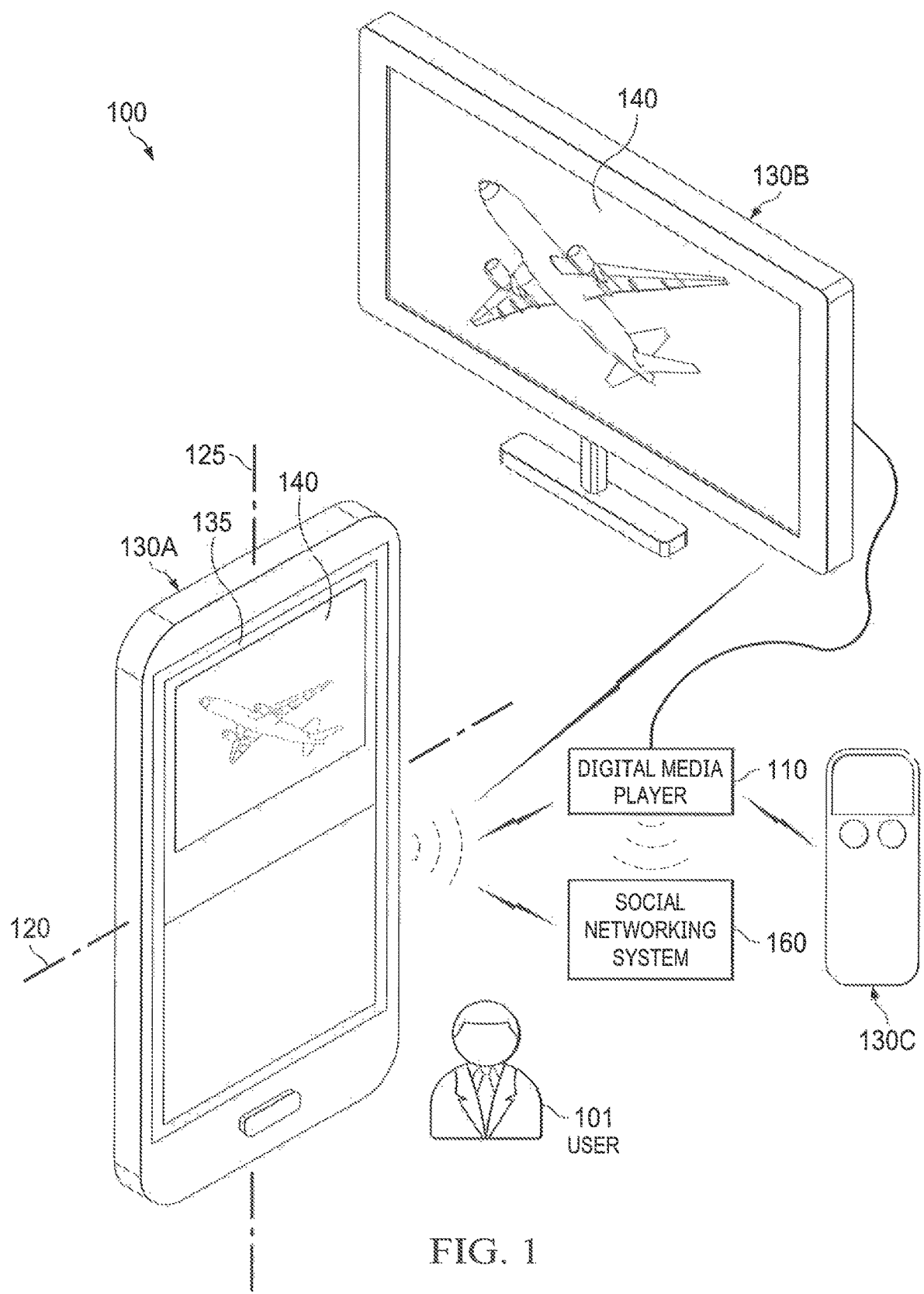
FIG. 1 illustrates an example environment for providing connected TV 360-degree media interactions.

FIG. 1 illustrates an example environment for providing connected TV 360-degree media interactions, according to certain embodiments. In general, a user 101 may utilize a client device 130 (e.g., a TV 130B) to view 360-degree media content 140 selected by the user 101. In some embodiments, 360-degree media content 140 is provided by a digital media player 110 and is selected using a wireless remote control 130C. In other embodiments, 360-degree media content 140 is wirelessly streamed, screencast ("cast" or "casting"), or otherwise provided by a client device 130. For example, a mobile application running on a smartphone 130A of user 101 may cast or wirelessly stream 360-degree media content 140 to digital media player 110 or TV 130B (e.g., a smart TV) for display. While 360-degree media content 140 is being displayed on TV 130B, user 101 may control a viewing direction within 360-degree media content 140 using client device 130. Specifically, user 101 may rotate client device 130 about a tilt axis 120 and a rotation axis 125 of client device 130, and the movements may be detected and used to make corresponding movements within 360-degree media content 140 being viewed on TV 130B.

In particular embodiments, user 101 may be an individual (human user), an entity (e.g., an enterprise, business, or third-party application), or a group (e.g., of individuals or entities) that interacts or communicates with or over social-networking system 160. In particular embodiments, one or more users 101 may use one or more client devices 130 to access, send data to, and receive data from social-networking system 160 or third-party system (e.g., third-party system 570 described below).

Digital media player 110 may be any computing system, device, microconsole, network appliance, entertainment device, and the like that is capable of receiving digital data from multiple content sources and stream it or otherwise provide it to a capable television such as TV 130B. Digital media player 110 may be any hardware or software that delivers content or possesses a network interface card (NIC) for connecting to a network such as local area network (LAN) or the Internet. For example, digital media player 110 may be a cable box provided by a Multiple System Operator (MSO) such as Comcast, Time Warner, AT&T U-verse, or Dish Network. In such examples, digital media player 110 may receive content from the MSO. As another example, digital media player 110 may be a device that streams 360-degree media content 140 from third-party internet websites or services such as over-the-top (OTT) providers. Examples of such digital media players 110 include, without limitation, devices from Roku, Boxee, Apple TV, and Google TV that allow users to access content from OTT providers such as NetFlix, Hulu, Amazon Video, YouTube, and the like. In some embodiments, digital media player 110 may be a stand-alone device. In other embodiments, the functionality of digital media player 110 may be incorporated into TV 130B that is connected to the Internet (e.g., a smart TV).

In some embodiments, digital media player 110 provides a graphical user interface (GUI) on client devices 130 such as TV 130B that allows user 101 to select which 360-degree media content 140 to display on TV 130B. In such embodiments, digital media player 110 may run various applications ("apps") that are provided by third parties such as OTT providers. For example, social-networking system 160 may provide an app that runs on digital media player 110 and allows user 101 to select 360-degree media content 140 from social-networking system 160 to display on TV 130B. In some embodiments, user 101 may utilize wireless remote control 130C to interact with the GUI of the app running on digital media player 110 and select which 360-degree media content 140 to play on TV 130B. In other embodiments, user 101 may utilize any other client device 130 such as smartphone 130A to interact with the GUI of the app running on digital media player 110 in order to select which 360-degree media content 140 to play on TV 130B.

In some embodiments, digital media player 110 communicates either wirelessly or via a wired connection with social-networking system 160 and various client devices 130 (e.g., smartphone 130A, TV 130B, and wireless remote control 130C). In some embodiments, digital media player 110 communicates directly with such devices. In other embodiments, digital media player 110 communicates with such devices over one or more networks such as network 510 described below.

In particular embodiments, client device 130 may be any appropriate electronic device including hardware, software, or embedded logic components or a combination of two or more such components and capable of carrying out the appropriate functionalities implemented or supported by client device 130. As an example and not by way of limitation, a client device 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client devices 130. A client device 130 may enable user 101 to access a network such as network 510 described below. A client device 130 may enable its user 101 to communicate with other users 101 at other client devices 130. In particular embodiments, client device 130A is a smartphone, client device 130B is a TV, and client device 130C is a wireless remote control.

In some embodiments, a mobile app 135 on client device 130 enables user 101 to view and select 360-degree media content 140 to display on another client device 130. For example, smartphone 130A may run a mobile app 135 that displays a personalized newsfeed that contains 360-degree videos and other media content (e.g., 360-degree photos) that may be selected for viewing on TV 130B. In some embodiments, mobile app 135 may provide a newsfeed or any other content described herein from social-networking system 160.

In some embodiments, 360-degree media content 140 may be any 360-degree show, movie, video clip, live video, photo, and the like. For example, 360-degree media content 140 may be a 360-degree video clip that is within a personalized newsfeed in mobile app 135 on smartphone 130A. In other embodiments, 360-degree media content 140 is a 360-degree video that is selected from a GUI of digital media player 110. In general, 360-degree media content 140 is media where a view in every direction is recorded at the same time. In some embodiments, 360-degree media content 140 is captured using an omnidirectional camera or multiple cameras. While 360-degree media content 140 is being displayed, user 101 has control of the viewing direction (e.g., like a panorama). In some embodiments, 360-degree media content 140 is media content that is determined to be relevant to user 101 by social-networking system 160 using, for example, social graph 600. For example, 360-degree media content 140 may be determined to be relevant to user 101 using an affinity coefficient, as described in more detail below.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of a network environment either directly or via a network. As an example and not by way of limitation, client device 130 may access social-networking system 160 using a web browser or a native application associated with social-networking system 160 (e.g., a mobile social-networking application, a messaging application, another suitable application, or any combination thereof) either directly or via a network. Social-networking system 160 is described in more detail below in reference to FIG. 5.

Figure 2A:
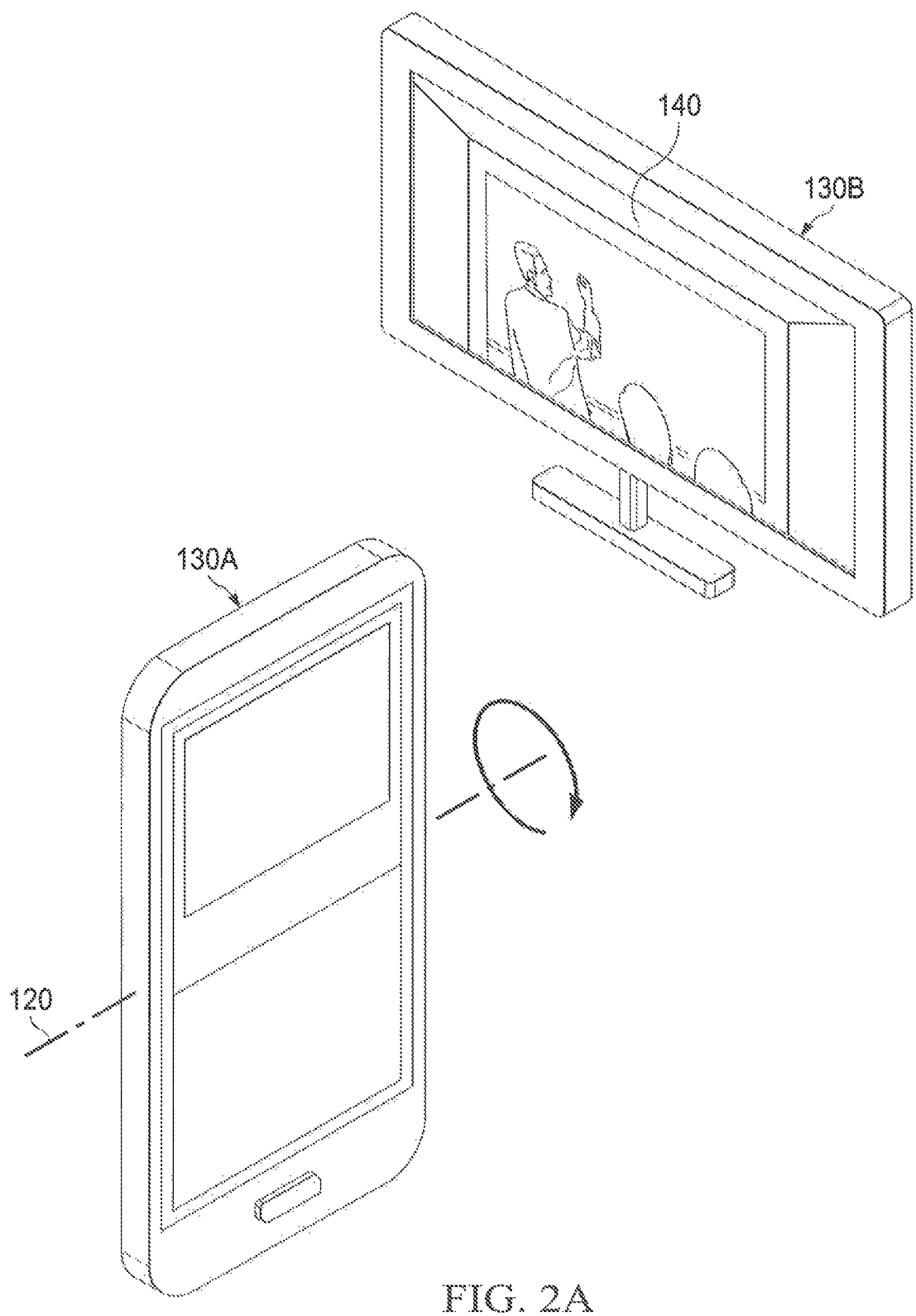
FIGS. 2A-2B illustrate an example client device of FIG. 1 being utilized for 360-degree media interactions.
Figure 2B:
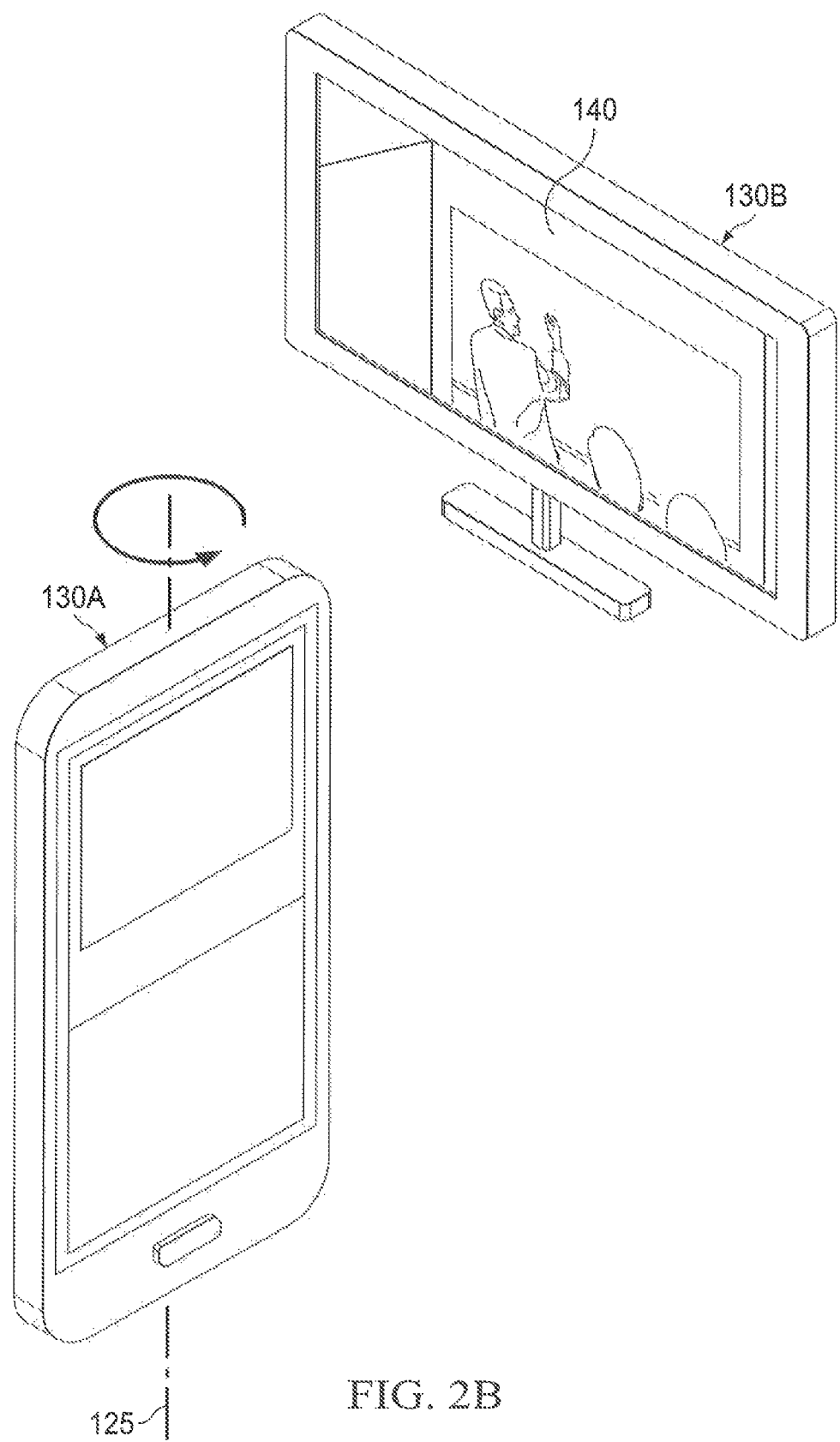

FIGS. 2A-2B illustrate an example client device 130 of FIG. 1 being utilized to interact with 360-degree media content 140 being displayed on TV 130B. While FIGS. 2A-2B illustrate smartphone 130A being used to interact with 360-degree media content 140 being displayed on TV 130B, other client devices 130 such as wireless remote control 130C may additionally or alternatively be used to interact with 360-degree media content 140 being displayed on TV 130B. In addition, while TV 130B is illustrated as being utilized to view 360-degree media content 140, any other appropriate client device 130 may be used.

FIG. 2A illustrates smartphone 130A being tilted about tilt axis 120 in order to adjust the viewing direction within 360-degree media content 140 up or down. In general, tilt axis 120 is an axis that runs parallel with the ground, horizon, or a plane of client device 130 (e.g., a plane that is parallel to a display, interface, or main component of client device 130). By tilting smartphone 130A about tilt axis 120, the viewing direction within 360-degree media content 140 may be adjusted either up or down. For example, by tilting the top of smartphone 130A toward user 101 about tilt axis 120 as indicated by the arrow in FIG. 2A, the viewing direction within 360-degree media content 140 may be adjusted up (e.g., the images within 360-degree media content 140 shift down to simulate the viewer looking up). Similarly, by tilting the top of smartphone 130A away from user 101 about tilt axis 120, the viewing direction within 360-degree media content 140 may be adjusted down (e.g., the images within 360-degree media content 140 shift up to simulate the viewer looking down). In some embodiments, motion data may indicate rotation about tilt axis 120, and the viewing direction within 360-degree media content 140 is adjusted based on a corresponding rotation about tilt axis 120.

FIG. 2B illustrates smartphone 130A being rotated about rotation axis 125 in order to adjust the viewing direction within 360-degree media content 140 left or right. In general, rotation axis 125 is an axis that runs perpendicular with the ground, horizon, or a plane of client device 130 (e.g., a plane that is parallel to a display, interface, or main component of client device 130). By rotating smartphone 130A about rotation axis 125, the viewing direction within 360-degree media content 140 may be adjusted either left or right. For example, by rotating smartphone 130A in a counter-clockwise direction about rotation axis 125 as indicated by the arrow in FIG. 2B, the viewing direction within 360-degree media content 140 may be adjusted to the right (e.g., the images within 360-degree media content 140 shift right to simulate the viewer looking left). Similarly, by rotating smartphone 130A in a clockwise direction about rotation axis 125, the viewing direction within 360-degree media content 140 may be adjusted to the left (e.g., the images within 360-degree media content 140 shift left to simulate the viewer looking right). In some embodiments, motion data may indicate rotation about rotation axis 125, and the viewing direction within 360-degree media content 140 is adjusted based on a corresponding rotation about rotation axis 125.

In operation of certain embodiments, user 101 utilizes a particular client device 130 to select which 360-degree media content 140 to display on another client device 130. In one example, user 101 uses smartphone 130A to select particular 360-degree media content 140 to display on TV 130B. For example, user 101 may select to cast or otherwise wireless stream 360-degree media content 140 from a newsfeed within mobile app 135 on smartphone 130A. In another example, user 101 may utilize wireless remote control 130C to select particular 360-degree media content 140 to display on TV 130B. For example, user 101 may utilize wireless remote control 130C to interact with a GUI displayed on TV 130B by digital media player 110 or by an internet-connected application executed by TV 130B in order to select particular 360-degree media content 140 to display on TV 130B.

Once the selected 360-degree media content 140 is displayed on client device 130 such as TV 130B, user 101 may utilize any appropriate client device 130 to control the viewing direction within 360-degree media content 140. For example, user 101 may utilize smartphone 130A or wireless remote control 130C to control the viewing direction within 360-degree media content 140. Using smartphone 130A as an example, user 101 may tilt and rotate smartphone 130A about tilt axis 120 and rotation axis 125 in order to cause corresponding adjustments to the viewing angle, as described above with respect to FIGS. 2A-2B. As a result, user 101 may be able to cast or otherwise display 360-degree media content 140 such as a 360-degree videos and images on a larger viewing screen while maintaining control over the viewing direction within 360-degree media content 140.

In some embodiments, movements of client device 130 about tilt axis 120 and rotation axis 125 are relayed to the client device 130 that is displaying 360-degree media content 140 via social-networking system 160. For example, if 360-degree media content 140 is being cast to TV 130B via a newsfeed of mobile app 135 that is provided by social-networking system 160, movements of smartphone 130A about tilt axis 120 and rotation axis 125 may be first transmitted to social-networking system 160. Social-networking system 160 may then send instructions to TV 130B or digital media player 110 to adjust the viewing direction within 360-degree media content 140 to correspond to the movements of smartphone 130A. In other embodiments, movements of client device 130 about tilt axis 120 and rotation axis 125 are sent directly to digital media player 110 or TV 130B. For example, if wireless remote control 130C is being used by user 101 to control 360-degree media content 140, movements of wireless remote control 130C about tilt axis 120 and rotation axis 125 may be sent directly to digital media player 110 or TV 130B from wireless remote control 130C.

In some embodiments, any appropriate sensors within client device 130 may be utilized to detect movements and orientation of client device 130. For example, one or more gyrometers or accelerometers may be used to detect movements of client device 130 about tilt axis 120 and rotation axis 125. Example sensors of client device 130 that may be used to detect movements and orientation of client device 130 are discussed below with respect to personal computing device 400.

Figure 3:
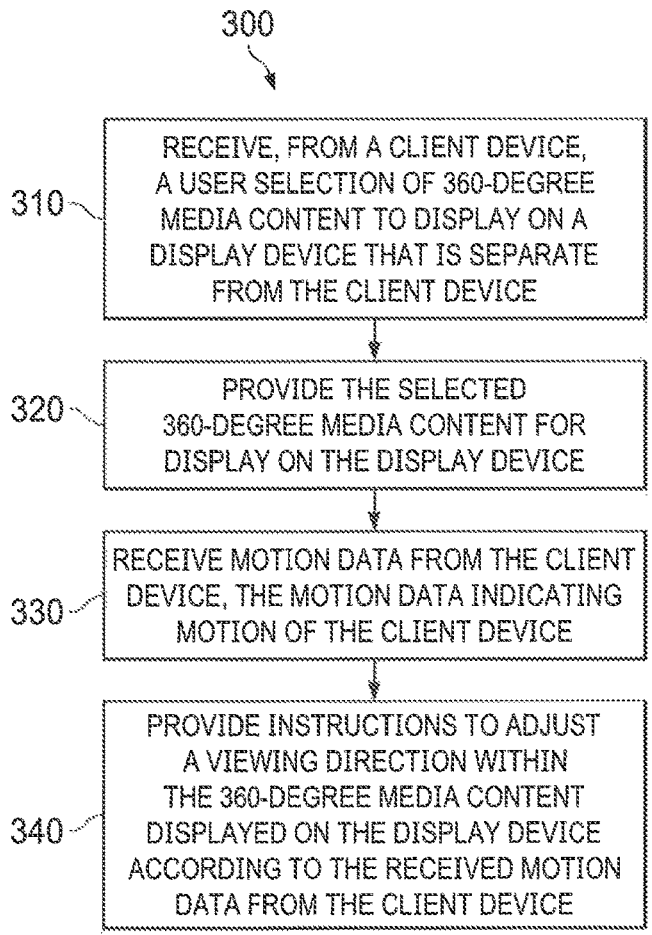
FIG. 3 illustrates an example method for providing connected TV 360-degree media interactions.

FIG. 3 illustrates an example method 300 for providing connected TV 360-degree media interactions. One or more steps of method 300 may be performed by one or more systems of social networking system 160, client device 130, digital media player 110, or any other appropriate system, device, or software.

Method 300 may begin at step 310, where a computing system receives, from a client device, a user selection of 360-degree media content to display on a display device that is separate from the client device. In some embodiments, the computing device is a digital media player such as digital media player 110 that is communicatively coupled to the display device. In other embodiments, the computing device is integrated within the display device (e.g., within an internet-connected TV). In some embodiments, the computing device is any server or computing system of social-networking system 160. In some embodiments, the client device is client device 130 and may be a smartphone (e.g., smartphone 130A), a tablet computer, a wireless remote control (e.g., wireless remote control 130C), or any other appropriate user device. In some embodiments, the display device is any client device 130 such as TV 130B. In some embodiments, the user selection of 360-degree media content to display on the display device in step 310 is made using a mobile application such as mobile app 135 that is running on the client device. In some embodiments, the 360-degree media content is a 360-degree video or a 360-degree image.

At step 320, the selected 360-degree media content is provided for display on the display device. In some embodiments, the selected 360-degree media content is 360-degree media content 140. In some embodiments, the selected 360-degree media content is wirelessly streamed by a client device 130 such as smartphone 130A. In other embodiments, the selected 360-degree media content is provided via the Internet by digital media player 110 or TV 130B.

At step 330, the computing system receives, from the client device, motion data that indicates motion of the client device. In some embodiments, the motion data indicates motion of the client device about a tilt axis and a rotation axis. In some embodiments, the tilt axis is tilt axis 120 and the rotation axis is rotation axis 125. In some embodiments, the motion data additionally or alternatively includes a current orientation of the client device in three-dimensional space.

At step 340, the computing system provides instructions to adjust a viewing direction within the 360-degree media content displayed on the display device according to the received motion data from the client device in step 330. For example, if the motion data indicates that the client device is being tilted about tilt axis 120, instructions are provided to adjust the displayed 360-degree media content either up or down. As another example, if the motion data indicates that the client device is being rotated about rotation axis 125, instructions are provided to adjust the displayed 360-degree media content either left or right. After step 340, method 300 may end.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for providing connected TV 360-degree media interactions including the particular steps of the method of FIG. 3, this disclosure contemplates any suitable method for providing connected TV 360-degree media interactions including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
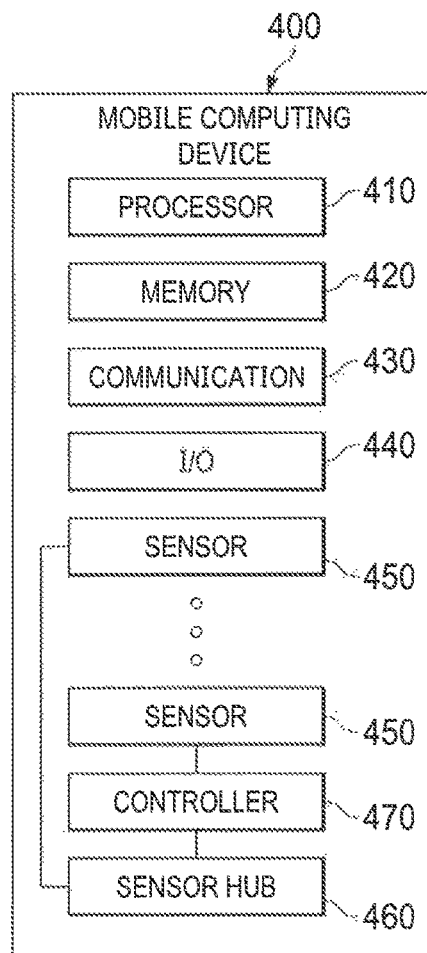
FIG. 4 illustrates an example personal computing device.

FIG. 4 illustrates an example personal computing device 400 that may be utilized as smartphone 130A or any other client device 130. In particular embodiments, personal computing device 400 may include a processor 410, a memory 420, a communication component 430 (e.g., antenna and communication interface for wireless communications), one or more input and/or output (I/O) components and/or interfaces 440, and one or more sensors 450. In particular embodiments, one or more I/O components and/or interfaces 440 may incorporate one or more sensors 450. In particular embodiments, personal computing device 400 may comprise a computer system or and element thereof as described in FIG. 7 and its associated description.

In particular embodiments, a personal computing device, such as a mobile device, may include various types of sensors 450, such as, for example and without limitation: touch sensors (disposed, for example, on a display of the device, the back of the device and/or one or more lateral edges of the device) for detecting a user touching the surface of the mobile electronic device (e.g., using one or more fingers); accelerometer for detecting whether the personal computing device 400 is moving and the speed of the movement; thermometer for measuring the temperature change near the personal computing device 400; proximity sensor for detecting the proximity of the personal computing device 400 to another object (e.g., a hand, desk, or other object); light sensor for measuring the ambient light around the personal computing device 400; imaging sensor (e.g., camera) for capturing digital still images and/or video of objects near the personal computing device 400 (e.g., scenes, people, bar codes, QR codes, etc.); location sensors (e.g., Global Positioning System (GPS)) for determining the location (e.g., in terms of latitude and longitude) of the mobile electronic device; sensors for detecting communication networks within close proximity (e.g., near field communication (NFC), Bluetooth, RFID), infrared); chemical sensors; biometric sensors for biometrics-based (e.g., fingerprint, palm vein pattern, hand geometry, iris/retina, DNA, face, voice, olfactory, sweat) authentication of user of personal computing device 400; etc. This disclosure contemplates that a mobile electronic device may include any applicable type of sensor. Sensors may provide various types of sensor data, which may be analyzed to determine the user's intention with respect to the mobile electronic device at a given time.

In particular embodiments, a sensors hub 460 may optionally be included in personal computing device 400. Sensors 450 may be connected to sensors hub 460, which may be a low power-consuming processor that controls sensors 450, manages power for sensors 450, processes sensor inputs, aggregates sensor data, and performs certain sensor functions. In addition, in particular embodiments, some types of sensors 450 may be connected to a controller 470. In this case, sensors hub 460 may be connected to controller 470, which in turn is connected to sensor 450. Alternatively, in particular embodiments, there may be a sensor monitor in place of sensors hub 460 for managing sensors 450.

In particular embodiments, in addition to the front side, personal computing device 400 may have one or more sensors for performing biometric identification. Such sensors may be positioned on any surface of personal computing device 400. In example embodiments, as the user's hand touches personal computing device 400 to grab hold of it, the touch sensors may capture the user's fingerprints or palm vein pattern. In example embodiments, while a user is viewing the screen of personal computing device 400, a camera may capture an image of the user's face to perform facial recognition. In example embodiments, while a user is viewing the screen of personal computing device 400, an infrared scanner may scan the user's iris and/or retina. In example embodiments, while a user is in contact or close proximity with personal computing device 400, chemical and/or olfactory sensors may capture relevant data about a user. In particular embodiments, upon detecting that there is a change in state with respect to the identity of the user utilizing personal computing device 400, either by itself or in combination with other types of sensor indications, personal computing device 400 may determine that it is being shared.

In particular embodiments, in addition to the front side, the personal computing device 400 may have touch sensors on the left and right sides. Optionally, the personal computing device 400 may also have touch sensors on the back, top, or bottom side. Thus, as the user's hand touches personal computing device 400 to grab hold of it, the touch sensors may detect the user's fingers or palm touching personal computing device 400. In particular embodiments, upon detecting that there is a change in state with respect to a user touching personal computing device 400, either by itself or in combination with other types of sensor indications, personal computing device 400 may determine that it is being shared.

In particular embodiments, personal computing device 400 may have an accelerometer in addition to or instead of the touch sensors on the left and right sides. Sensor data provided by the accelerometer may also be used to estimate whether a new user has picked up personal computing device 400 from a resting position, e.g., on a table or desk, display shelf, or from someone's hand or from within someone's bag. When the user picks up personal computing device 400 and brings it in front of the user's face, there may be a relatively sudden increase in the movement speed of personal computing device 400. This change in the device's movement speed may be detected based on the sensor data supplied by the accelerometer. In particular embodiments, upon detecting that there is a significant increase in the speed of the device's movement, either by itself or in combination with other types of sensor indications, personal computing device 400 may determine that it is being shared.

In particular embodiments, personal computing device 400 may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of personal computing device 400. When personal computing device 400 is stored on a shelf or in the user's bag, it may stay mostly in one orientation. However, when the user grabs hold of personal computing device 400 and lifts it up and/or moves it closer to bring it in front of the user's face, there may be a relatively sudden change in the orientation of personal computing device 400. The orientation of personal computing device 400 may be detected and measured by the gyrometer. If the orientation of personal computing device 400 has changed significantly. In particular embodiments, upon detecting that there is a significant change in the orientation of personal computing device 400, either by itself or in combination with other types of sensor indications, personal computing device 400 may determine that it is being shared.

In particular embodiments, personal computing device 400 may have a light sensor. When personal computing device 400 is stored in a user's pocket or case, it is relatively dark around personal computing device 400. On the other hand, when the user brings personal computing device 400 out of his pocket, it may be relatively bright around personal computing device 400, especially during day time or in well-lit areas. The sensor data supplied by the light sensor may be analyzed to detect when a significant change in the ambient light level around personal computing device 400 occurs. In particular embodiments, upon detecting that there is a significant increase in the ambient light level around personal computing device 400, either by itself or in combination with other types of sensor indications, personal computing device 400 may determine that it is being shared.

In particular embodiments, personal computing device 400 may have a proximity sensor. The sensor data supplied by the proximity sensor may be analyzed to detect when personal computing device 400 is in close proximity to a specific object, such as the user's hand. For example, mobile device 400 may have an infrared LED (light-emitting diode) 490 (i.e., proximity sensor) placed on its back side. When the user holds such a mobile device in his hand, the palm of the user's hand may cover infrared LED 490. As a result, infrared LED 490 may detect when the user's hand is in close proximity to mobile device 400. In particular embodiments, upon detecting that personal computing device 400 is in close proximity to the user's hand, either by itself or in combination with other types of sensor indications, personal computing device 400 may determine that it is being shared.

A personal computing device 400 may have any number of sensors of various types, and these sensors may supply different types of sensor data. Different combinations of the individual types of sensor data may be used together to detect and estimate a user's current intention with respect to personal computing device 400 (e.g., whether the user really means to take personal computing device 400 out of his pocket and use it). Sometimes, using multiple types of sensor data in combination may yield a more accurate, and thus better, estimation of the user's intention with respect to personal computing device 400 at a given time than only using a single type of sensor data. Nevertheless, it is possible to estimate the user's intention using a single type of sensor data (e.g., touch-sensor data).

Figure 5:
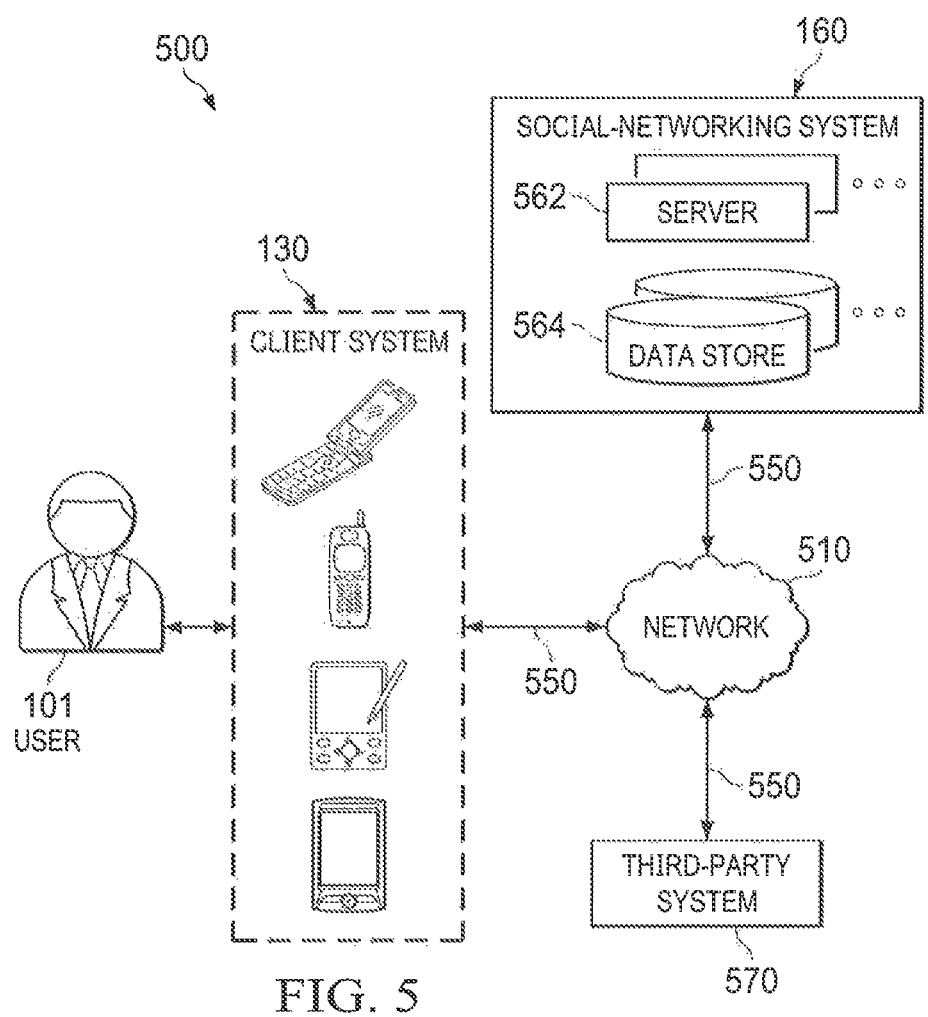
FIG. 5 illustrates an example network environment associated with a social-networking system.

FIG. 5 illustrates an example network environment 500 associated with a social-networking system. Network environment 500 includes a user 101, a client device 130, a social-networking system 160, and a third-party system 570 connected to each other by a network 510. Although FIG. 5 illustrates a particular arrangement of user 101, client device 130, social-networking system 160, third-party system 570, and network 510, this disclosure contemplates any suitable arrangement of user 101, client device 130, social-networking system 160, third-party system 570, and network 510. As an example and not by way of limitation, two or more of client devices 130, social-networking system 160, and third-party system 570 may be connected to each other directly, bypassing network 510. As another example, two or more of client devices 130, social-networking system 160, and third-party system 570 may be physically or logically co-located with each other in whole or in part. Moreover, although FIG. 5 illustrates a particular number of users 101, client devices 130, social-networking systems 160, third-party systems 570, and networks 510, this disclosure contemplates any suitable number of users 101, client devices 130, social-networking systems 160, third-party systems 570, and networks 510. As an example and not by way of limitation, network environment 500 may include multiple client devices 130, social-networking systems 160, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client device 130, social-networking system 160, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 500 either directly or via network 510. As an example and not by way of limitation, client device 130 may access social-networking system 160 using a web browser or a native application associated with social-networking system 160 (e.g., a mobile social-networking application, a messaging application, another suitable application, or any combination thereof) either directly or via network 510. In particular embodiments, social-networking system 160 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 160 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client device 130, a social-networking system 160, or a third-party system 570 to manage, retrieve, modify, add, or delete, the information stored in data store 564.

In particular embodiments, social-networking system 160 may store one or more social graphs (e.g., social graph 600) in one or more data stores 564. In particular embodiments, a social graph may include multiple nodes—which may include multiple user nodes (each corresponding to a particular user 101) or multiple concept nodes (each corresponding to a particular concept)—and multiple edges connecting the nodes. Social-networking system 160 may provide users 101 of the online social network the ability to communicate and interact with other users 101. In particular embodiments, users 101 may join the online social network via social-networking system 160 and then add connections (e.g., relationships) to a number of other users 101 of social-networking system 160 to whom they want to be connected. Herein, the term "friend" may refer to any other user 101 of social-networking system 160 with whom a user 101 has formed a connection, association, or relationship via social-networking system 160.

In particular embodiments, social-networking system 160 may provide users 101 with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 570, which is separate from social-networking system 160 and coupled to social-networking system 160 via a network 510.

In particular embodiments, social-networking system 160 may be capable of linking a variety of entities. As an example and not by way of limitation, social-networking system 160 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 160. In particular embodiments, however, social-networking system 160 and third-party systems 570 may operate in conjunction with each other to provide social-networking services to users of social-networking system 160 or third-party systems 570. In this sense, social-networking system 160 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client device 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client device 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client devices 130 or one or more third-party system 570 via network 510. The web server may include a mail server or other messaging functionality for receiving and routing messages between social-networking system 160 and one or more client devices 130. An API-request server may allow a third-party system 570 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client device 130. Information may be pushed to a client device 130 as notifications, or information may be pulled from client device 130 responsive to a request received from client device 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 570), such as, for example, by setting appropriate privacy settings. Third-party-content-object stores may be used to store content objects received from third parties, such as a third-party system 570. Location stores may be used for storing location information received from client devices 130 associated with users. Advertisement-pricing modules may combine social information, the current time, location information, or other suitable information to provide relevant advertisements, in the form of notifications, to a user.

Figure 6:
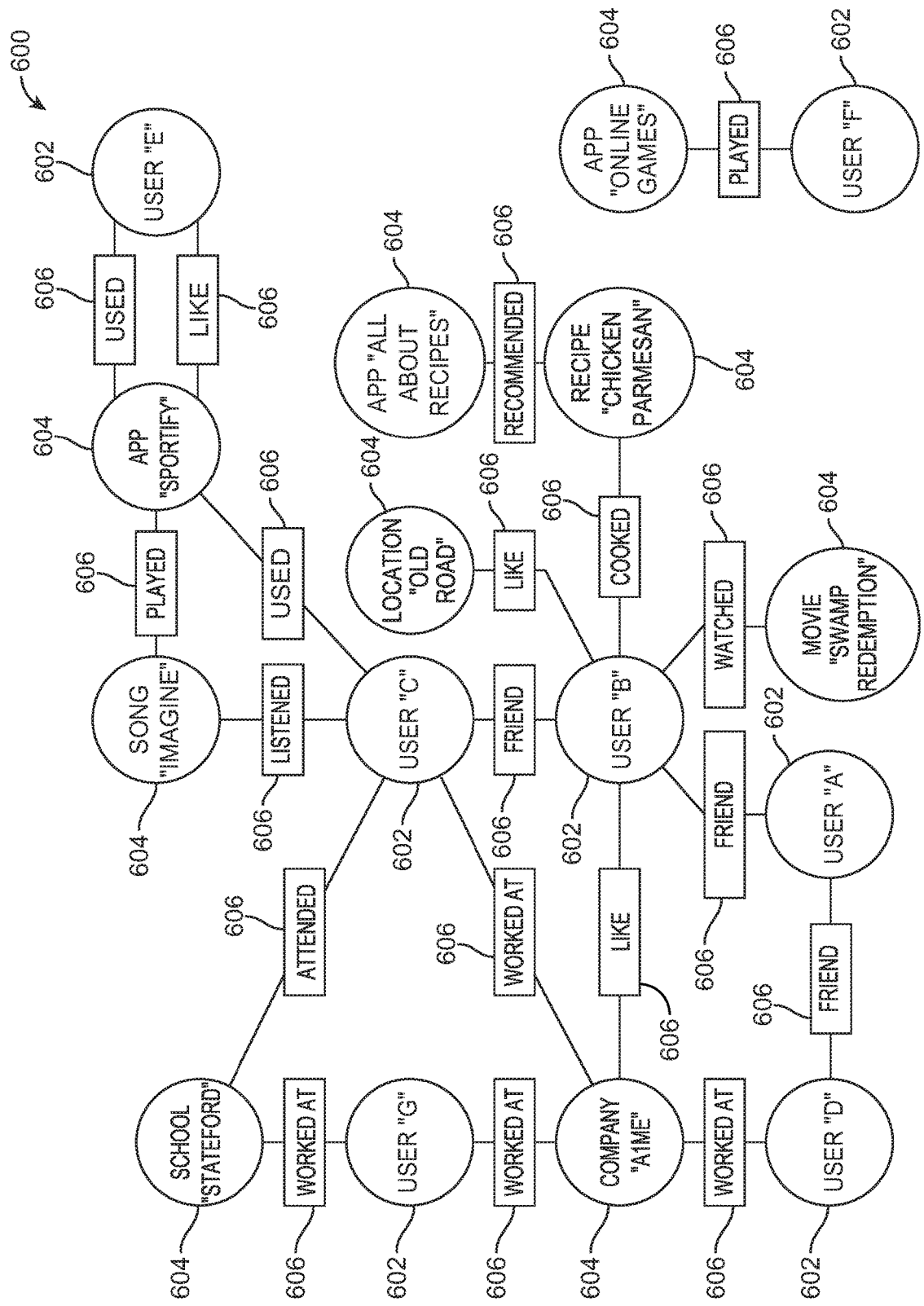
FIG. 6 illustrates an example social graph.

FIG. 6 illustrates example social graph 600. In particular embodiments, social-networking system 160 may store one or more social graphs 600 in one or more data stores. In particular embodiments, social graph 600 may include multiple nodes-which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a social-networking system 160, client device 130, or third-party system 570 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 160. In particular embodiments, a user node 602 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 160. Profile pages may also be hosted on third-party websites associated with a third-party system 570. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client device 130 to send to social-networking system 160 a message indicating the user's action. In response to the message, social-networking system 160 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 606 connecting the first user's user node 602 to the second user's user node 602 in social graph 600 and store edge 606 as social-graph information in one or more of data stores 564. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played,"

"listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 160 may create a "played" edge 606 (as illustrated in FIG. 6) between concept nodes 604 corresponding to the song and the application to indicate that the particular song was played by the particular application. In this case, "played" edge 606 corresponds to an action performed by an external application (SPOTIFY) on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604 for "SPOTIFY").

In particular embodiments, social-networking system 160 may create an edge 606 between a user node 602 and a concept node 604 in social graph 600. As an example and not by way of limitation, a user viewing a concept-profile page (such as, for example, by using a web browser or a special-purpose application hosted by the user's client device 130) may indicate that he or she likes the concept represented by the concept node 604 by clicking or selecting a "Like" icon, which may cause the user's client device 130 to send to social-networking system 160 a message indicating the user's liking of the concept associated with the concept-profile page. In response to the message, social-networking system 160 may create an edge 606 between user node 602 associated with the user and concept node 604, as illustrated by "like" edge 606 between the user and concept node 604. In particular embodiments, social-networking system 160 may store an edge 606 in one or more data stores. In particular embodiments, an edge 606 may be automatically formed by social-networking system 160 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 570 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 570, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 570, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 600, social-networking system 160 may analyze the number and/or type of edges 606 connecting particular user nodes 602 and concept nodes 604 when calculating a coefficient. As an example and not by way of limitation, user nodes 602 that are connected by a spouse-type edge (representing that the two users are married) may be assigned a higher coefficient than a user nodes 602 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 600. As an example and not by way of limitation, social-graph entities that are closer in the social graph 600 (i.e., fewer degrees of separation) may have a higher coefficient than entities that are further apart in the social graph 600.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client device 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 570 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 7:
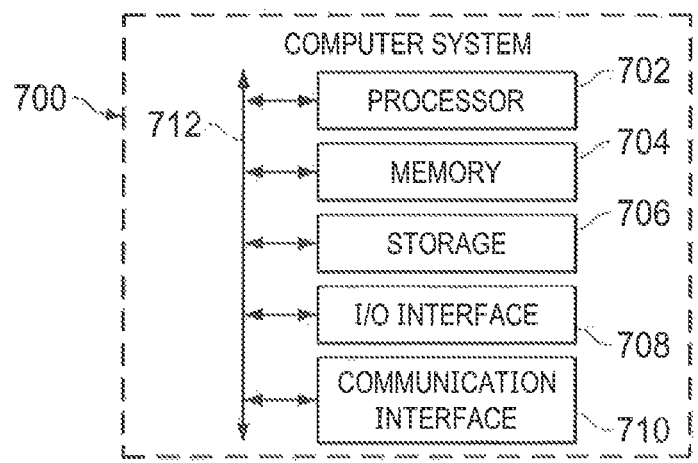
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a computing system, receiving, from a client device, 360-degree media content to display on a display device that is separate from the client device, wherein:
the 360-degree media content is wirelessly streamed from the client device to the computing system; and
the 360-degree media content is selected from a personalized newsfeed displayed on the client device;
by the computing system, providing the selected 360-degree media content for display on the display device;
by the computing system, receiving motion data from the client device, the motion data indicating motion of the client device; and
by the computing system, providing instructions to adjust a viewing direction within the 360-degree media content displayed on the display device according to the received motion data from the client device.

2. The method of claim 1, wherein:
the computing system is a digital media player communicatively coupled to the display device or integrated within the display device;
the client device comprises a smartphone or a tablet computer;
the display device comprises a television; and
the 360-degree media content is selected using a mobile application running on the client device.

3. The method of claim 1, wherein:
the client device comprises a wireless remote control; and
the display device comprises a television.

4. The method of claim 1, wherein the 360-degree media content comprises a 360-degree video or a 360-degree picture.

5. The method of claim 1, wherein the motion data indicates motion of the client device about a tilt axis and/or a rotation axis.

6. The method of claim 5, wherein:
the tilt axis is parallel to a plane of the client device;
the motion data indicates rotation about the tilt axis; and
the viewing direction within the 360-degree media content is adjusted based on a corresponding rotation about the tilt axis.

7. The method of claim 5, wherein:
the rotation axis is perpendicular to a plane of the client device;
the motion data indicates rotation about the rotation axis; and
the viewing direction within the 360-degree media content is adjusted based on a corresponding rotation about the rotation axis.

8. One or more computer-readable non-transitory storage media in a computing system, the media embodying logic that is operable when executed to:
receive, from a client device, 360-degree media content to display on a display device that is separate from the client device, wherein:
the 360-degree media content is wirelessly streamed from the client device to the computing system; and
the 360-degree media content is selected from a personalized newsfeed displayed on the client device;
provide the selected 360-degree media content for display on the display device;
receive motion data from the client device, the motion data indicating motion of the client device; and
provide instructions to adjust a viewing direction within the 360-degree media content displayed on the display device according to the received motion data from the client device.

9. The media of claim 8, wherein:
the computing system is a digital media player communicatively coupled to the display device or integrated within the display device;
the client device comprises a smartphone or a tablet computer;
the display device comprises a television; and
the 360-degree media content is selected using a mobile application running on the client device.

10. The media of claim 8, wherein:
the client device comprises a wireless remote control; and
the display device comprises a television.

11. The media of claim 8, wherein the 360-degree media content comprises a 360-degree video or a 360-degree picture.

12. The media of claim 8, wherein the motion data indicates motion of the client device about a tilt axis and/or a rotation axis.

13. The media of claim 12, wherein:
the tilt axis is parallel to a plane of the client device;
the motion data indicates rotation about the tilt axis; and
the viewing direction within the 360-degree media content is adjusted based on a corresponding rotation about the tilt axis.

14. The media of claim 12, wherein:
the rotation axis is perpendicular to a plane of the client device;
the motion data indicates rotation about the rotation axis; and
the viewing direction within the 360-degree media content is adjusted based on a corresponding rotation about the rotation axis.

15. A system, comprising:
one or more memory devices; and
a processor communicatively coupled to the one or more memory devices, the processor operable to:
receive, from a client device, 360-degree media content to display on a display device that is separate from the client device, wherein:
the 360-degree media content is wirelessly streamed from the client device to the computing system; and
the 360-degree media content is selected from a personalized newsfeed displayed on the client device;
provide the selected 360-degree media content for display on the display device;
receive motion data from the client device, the motion data indicating motion of the client device; and
provide instructions to adjust a viewing direction within the 360-degree media content displayed on the display device according to the received motion data from the client device.

16. The system of claim 15, wherein:
the computing system is a digital media player communicatively coupled to the display device or is integrated within the display device;
the client device comprises a smartphone or a tablet computer,
the display device comprises a television; and
the 360-degree media content is selected using a mobile application running on the client device.

17. The system of claim 5, wherein:
the client device comprises a wireless remote control; and
the display device comprises a television.

18. The system of claim 15, wherein the motion data indicates motion of the client device about a tilt axis and/or a rotation axis.

19. The system of claim 18, wherein:
the tilt axis is parallel to a plane of the client device;
the motion data indicates rotation about the tilt axis; and
the viewing direction within the 360-degree media content is adjusted based on a corresponding rotation about the tilt axis.

20. The system of claim 18, wherein:
the rotation axis is perpendicular to a plane of the client device;
the motion data indicates rotation about the rotation axis; and
the viewing direction within the 360-degree media content is adjusted based on a corresponding rotation about the rotation axis.

* * * * *